(12) United States Patent
Lin

(10) Patent No.: US 11,528,686 B2
(45) Date of Patent: Dec. 13, 2022

(54) METHOD AND DEVICE FOR TRANSMITTING UPLINK CONTROL INFORMATION

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 636 days.

(21) Appl. No.: 16/336,813

(22) PCT Filed: Feb. 11, 2018

(86) PCT No.: PCT/CN2018/076358
§ 371 (c)(1),
(2) Date: Mar. 26, 2019

(87) PCT Pub. No.: WO2019/153311
PCT Pub. Date: Aug. 15, 2019

(65) Prior Publication Data
US 2021/0368493 A1 Nov. 25, 2021

(51) Int. Cl.
H04W 4/00 (2018.01)
H04W 72/04 (2009.01)
(52) U.S. Cl.
CPC .............................. H04W 72/0413 (2013.01)
(58) Field of Classification Search
CPC ... H04L 1/1861; H04L 1/1864; H04L 5/0051; H04L 5/0053; H04L 5/0055
See application file for complete search history.

(56) References Cited

U.S. PATENT DOCUMENTS 8,611,238 B2 12/2013 Papasakellariou
9,980,255 B2 5/2018 Cheng et al.
(Continued)

FOREIGN PATENT DOCUMENTS

CN 102378373 A 3/2012
CN 103209483 A 7/2013
(Continued)

OTHER PUBLICATIONS

Second Office Action of the Chilean application No. 201903755, dated Apr. 20, 2021.
(Continued)

Primary Examiner — Bo Hui A Zhu
(74) Attorney, Agent, or Firm — Ladas & Parry LLP

(57) ABSTRACT

Disclosed is a method for transmitting Uplink Control Information. The method includes: determining, by a terminal device, a set of uplink control channel resources according to the first number of bits, the first number of bits being determined according to high-level parameters; receiving configuration information sent by a network device, the configuration information indicating an uplink control channel resource in the set of uplink control channel resources; determining first UCI to be transmitted according to a channel format corresponding to the uplink control channel resource, the number of bits occupied by the first UCI being less than or equal to the first number of bits; and transmitting the first UCI in the uplink control channel resource using the channel format. Therefore, the terminal device determines the UCI to be transmitted based on the channel format corresponding to the uplink control channel resource, so that the number of bits for actual transmission of the UCI is less than or equal to the number of bits of the UCI determined according to the high-level parameters, thereby improving transmission efficiency of the UCI.

15 Claims, 3 Drawing Sheets

(56) References Cited

U.S. PATENT DOCUMENTS

| | | | |
|---|---|---|---|
| 2010/0278109 | A1 | 11/2010 | Papasakellariou |
| 2011/0310759 | A1 | 12/2011 | Gerstenberger |
| 2014/0362792 | A1 | 12/2014 | Cheng et al. |
| 2016/0014764 | A1 | 1/2016 | Papasakellariou et al. |
| 2017/0303271 | A1 | 10/2017 | Seo et al. |
| 2017/0325216 | A1 | 11/2017 | Nogami et al. |
| 2018/0054280 | A1 | 2/2018 | Fu et al. |
| 2018/0167935 | A1 | 6/2018 | Yan et al. |
| 2018/0263031 | A1 | 9/2018 | Cheng et al. |
| 2019/0289586 | A1 | 9/2019 | Ouchi et al. |
| 2020/0366446 | A1* | 11/2020 | Matsumura ....... H04W 72/0413 |
| 2020/0396039 | A1* | 12/2020 | Baldemair ............ H04L 5/0055 |

FOREIGN PATENT DOCUMENTS

| | | |
|---|---|---|
| CN | 105227266 A | 1/2016 |
| CN | 106060930 A | 10/2016 |
| CN | 106160956 A | 11/2016 |
| CN | 106257856 A | 12/2016 |
| CN | 107005374 A | 8/2017 |
| CN | 107113805 A | 8/2017 |
| ER | 102437895 A | 5/2012 |
| JP | 2014503140 A | 2/2014 |
| JP | 2017092614 A | 5/2017 |
| RU | 2562102 C2 | 9/2015 |
| WO | 2010126339 A2 | 11/2010 |
| WO | 2013109073 A1 | 7/2013 |
| WO | 2013128339 A1 | 8/2013 |
| WO | 2016163720 A1 | 10/2016 |
| WO | 2016185641 A1 | 11/2016 |
| WO | 2017024554 A1 | 2/2017 |
| WO | 2017167003 A1 | 10/2017 |
| WO | 2017195769 A1 | 11/2017 |

OTHER PUBLICATIONS

Office Action of the Indian application No. 201917051250, dated May 7, 2021.
First Office Action of the Russian application No. 2019141684, dated Jun. 21, 2021.
First Office Action of the Chile application No. 201903755, dated Jan. 19, 2021.
Third Office Action of the European application No. 18847182.5, dated Feb. 23, 2021.
First Office Action of the Canadian application No. 3063789, dated Feb. 25, 2021.
Cohere Technologies: "Design of Long-PUCCH for UCI of more than 2 bits", 3GPP Draft; R1-1711251 Design of Long-PUCCH for UCI of More Than 2 Bits, 3rd Generation Partnership Project (3GPP), Mobile Competence Centre; 650, Route Des Lucioles; F-06921 Sophia-Antipolis Cedex, vol. RAN WG1, no. Qingdao, China; Jun. 27, 2017-Jun. 30, 2017 Jun. 17, 2017 (Jun. 17 2017), XP051305506, URL: http://www.3gpp.org/ftp/tsg_ran/WG1_RL1/TSGR1_AH/NR_AH_1706/Docs/ [retrieved on Jun. 17, 2017].
First Office Action in corresponding European application No. 18847182.5, dated Mar. 6, 2020.
Nokia et al., "PUCCH Resource Allocation", 3GPP TSG-RAN WG1 #91,R1-1720014, issued on Nov. 27, 2017, sections 2, 3.1.
Oppo, "HARQ-ACK feedback for Rel-13 CA", 3GPP TSG RAN WG1 Meeting #83, R1-157188, issued on Nov. 15, 2015, sections 1-3.
NTT Docomo, Inc. "Remaining details for HARQ-ACK codebook adaptation based on DAI", 3GPP TSG RAN WG1 Meeting #83, R1-157228, issued on Nov. 15, 2015, section 2 proposal 1.
First Office Action in corresponding Chinese application No. 201880003220.6, dated Mar. 20, 2020.
Oppo, "Summary of email discussion [90b-NR-29] on PUCCH resource set", 3GPP TSG RAN WG1 Meeting 91 R1-1719972, issued on Dec. 1, 2017, entire document.
Oppo, "Summary of offline discussions for PUCCH resource allocation until", 3GPP TSG RAN WG1 Meeting 90bis R1-1719168, issued on Oct. 13, 2017.
Second Office Action of the Chinese application No. 201880003220. 6, dated Jun. 2, 2020.
Second Office Action of the European application No. 18847182.5, dated Sep. 3, 2020.
International Search Report in international application No. PCT/CN2018/076358, dated Oct. 25, 2018.
Written Opinion of the International Search Authority in international application No. PCT/CN2018/076358, dated Oct. 25, 2018.
Huawei et al:"Long duration PUCCH formats", 3GPP Draft; R1-1706954, 3rd Generation Partnership Project (3GPP), Mobile Competence Centre ; 650, Route Des Lucioles ; F-06921 Sophia-Antipolis Cedex; France, vol. RAN WG1, no. Hangzhou, China; May 15, 2017-May 19, 2017 May 14, 2017 (May 14, 2017), XP051272184.
Intel Corporation:"UCI contents and UL control channel formats", 3GPP Draft; R1-1611893 Intel UCI Content NR PUCCH, 3rd Generation Partnership Project (3GPP), Mobile Competence Centre; 650, Route Des Lucioles; F-06921 Sophia-Antipolis Cedex ; France, vol. RAN WG1, no. Reno, USA Nov. 14, 2016-Nov. 18, 2016 Nov. 6, 2016 (Nov. 6, 2016), XP051190803.
Guangdong Oppo Mobile Telecom: "Discussion on long PUCCH for up to 2 UCI bits", 3GPP Draft; R1-1710158, 3rd Generation Partnership Project (3GPP), Mobile Competence Centre ; 650, Route Des Lucioles ; F-06921 Sophia-Antipolis Cedex; France, vol. RAN WG1, no. Qingdao, P.R. China Jun. 27, 2017-Jun. 30, 2017 Jun. 26, 2017 (Jun. 26, 2017), XP051299382.
International Search Report in the International application No. PCT/CN2018/076358, dated Oct. 25, 2018.
Supplementary European Search Report in the European application No. 18847182.5, dated Jun. 24, 2019.
Oppo, "Summary of offline discussions on PUCCH resource allocation", 3GPP TSG RAN WG1 Meeting AH 1801 R1-1801087,Vancouver, Canada, Jan. 22-26, 2018.
First Office Action of the Israeli application No. 270652, dated Jan. 27, 2022.
3GPP TSG RAN WG1 Meeting 91 R1-1721685, Reno, USA, Nov. 27-Dec. 1, 2017, Source: OPPO, Title: Summary of offline discussion on PUCCH resource allocation, Agenda Item: 7.3.2.4, Document for: Discussion and Decision.
First Office Action of the Japanese application No. 2019-565216, dated Jan. 21, 2022.
European Search Report in the European application No. 21212187. 5, dated Mar. 9, 2022.
Written Opinion of the Singaporean application No. 11201910764S, dated May 24, 2022.
He Chenglong. et, al. "Research on PUSCH channel of LTE-A system". Mathematical technology and Application, No. 8, 2013(08).
First Office Action of the Chinese application No. 202011287960.2, dated Jun. 6, 2022.
Second Office Action of the Japanese application No. 2019-565216, dated Aug. 5, 2022.
Second Office Action of the Chinese application No. 202011287960. 2, dated Sep. 13, 2022.
First Office Action of the Chinese application No. 202011290384.7, dated Nov. 3, 2022.

* cited by examiner

US 11,528,686 B2

METHOD AND DEVICE FOR TRANSMITTING UPLINK CONTROL INFORMATION

RELATED APPLICATION

This application is an application under 35 U.S.C. 371 of International Application No. PCT/CN2018/076358 filed on Feb. 11, 2018, the entire contents of which are incorporated herein by reference.

TECHNICAL FIELD

The disclosure relates to the field of communication, and in particular to a method and device for transmitting Uplink Control Information (UCI).

BACKGROUND

In a 5th Generation (5G) system or a New Radio (NR) system, a plurality of channel formats for an uplink control channel are supported, and different channel formats can support corresponding numbers of bits of UCI. A terminal device may select an uplink control channel for transmitting the UCI according to a configuration of a network device, and transmits the UCI by using a channel format corresponding to the uplink control channel. However, when the number of bits of UCI determined according to high-level parameters is not matched with the number of bits of UCI that is actually scheduled, this may cause the unnecessary bit overhead and thus transmission efficiency of the UCI is affected.

SUMMARY

The embodiments of the disclosure provide a method and device for transmitting UCI, which can improve the transmission efficiency of the UCI.

According to a first aspect, the disclosure provides a method for transmitting UCI. The method includes the following operations. A terminal device determines a set of uplink control channel resources according to the first number of bits, and the first number of bits is determined according to high-level parameters. The terminal device receives configuration information sent by a network device, and the configuration information indicates an uplink control channel resource in the set of uplink control channel resources. The terminal device determines first UCI to be transmitted according to a channel format corresponding to the uplink control channel resource, and the number of bits occupied by the first UCI is less than or equal to the first number of bits. The terminal device transmits the first UCI by using the channel format in the uplink control channel resource.

Therefore, the terminal device determines the UCI to be transmitted based on the channel format corresponding to the uplink control channel resource, so that the number of bits for actual transmission of the UCI is less than or equal to the number of bits of the UCI determined according to the high-level parameters, thereby avoiding unnecessary bit overhead, and improving the transmission efficiency of the UCI.

In a possible implementation manner, the first number of bits is greater than or equal to a first threshold.

For example, the first threshold is equal to 2.

In a possible implementation manner, the operation that the terminal device determines the first UCI to be transmitted according to the channel format corresponding to the uplink control channel resource may include the following action. Responsive to determining that the channel format corresponding to the uplink control channel resource is a first type of channel format, the terminal device determines that the number of bits occupied by the first UCI is equal to the first number of bits. The maximum number of bits supported by the first type of channel format is greater than the first threshold.

In a possible implementation manner, the operation that the terminal device determines to-be-transmitted first UCI according to a channel format corresponding to the uplink control channel resource may include the following action. Responsive to determining that the channel format corresponding to the uplink control channel resource is a second type of channel format, the terminal device determines that the first UCI is feedback information corresponding to a received PDSCH. The maximum number of bits supported by the second type of channel format is less than or equal to the first threshold.

In a possible implementation manner, before the terminal device determines that the first UCI is the feedback information corresponding to the received PDSCH, the method may further include the following operation. The terminal device receives a PDSCH in a target time unit set; or, the terminal device receives multiple PDSCHs in the target time unit set, the number of the multiple PDSCHs is less than or equal to the first threshold, and each PDSCH carries a transmission block. The target time unit set includes at least one time unit, and the uplink control channel resource is configured to carry feedback information corresponding to PDSCHs received in a target time unit.

According to a second aspect, the disclosure provides a method for transmitting UCI, which may include the following operations. A network device determines a set of uplink control channel resources according to the first number of bits, and the first number of bits is determined according to high-level parameters. The network device determines an uplink control channel resource from the set of uplink control channel resources, and the uplink control channel resource is configured to receive first UCI sent by a terminal device. The network device determines the first UCI to be received according to a channel format corresponding to the uplink control channel resource, and the number of bits occupied by the first UCI is less than or equal to the first number of bits. The network device detects the first UCI sent by the terminal device by using the channel format in the uplink control channel resource.

Therefore, the network device receives the UCI sent by the terminal device based on the channel format corresponding to the uplink control channel resource, and the number of bits of the actually received UCI is less than or equal to the number of bits of the UCI determined according to the high-level parameters, thereby avoiding unnecessary bit overhead and improving the transmission efficiency of the UCI.

In a possible implementation manner, the first number of bits is greater than or equal to a first threshold.

In a possible implementation manner, the operation that the network device determines the first UCI to be received according to the channel format corresponding to the uplink control channel resource may include the following action. Responsive to determining that the channel format corresponding to the uplink control channel resource is a first type of channel format, the network device determines that the number of bits occupied by the first UCI is equal to the first number of bits. The maximum number of bits supported by the first type of channel format is greater than the first threshold.

In a possible implementation manner, the operation that the network device determines the first UCI to be received according to the channel format corresponding to the uplink control channel resource may include the following action. Responsive to determining that the channel format corresponding to the uplink control channel resource is a second type of channel format, the network device determines that the first UCI is feedback information corresponding to a sent PDSCH. The maximum number of bits supported by the second type of channel format is less than or equal to the first threshold.

In a possible implementation manner, before the network device determines that the first UCI is the feedback information corresponding to the sent PDSCH, the method may further include the following operation. The network device sends a PDSCH in a target time unit set; or, the network device sends at least one PDSCH in the target time unit set, the number of the at least one PDSCH is less than or equal to the first threshold and each PDSCH carries a transmission block. The target time unit set includes at least one time unit, and the uplink control channel resource is configured to carry feedback information corresponding to PDSCHs sent in a target time unit.

In a possible implementation manner, the first threshold is 2.

According to a third aspect, the disclosure provides a terminal device. The terminal device may execute operations of the terminal device in the first aspect or any optional implementation manner of the first aspect. Specifically, the terminal device may include modules configured to execute the operations of the terminal device in the first aspect or any optional implementation manner of the first aspect.

According to a fourth aspect, the disclosure provides a network device. The network device may execute operations of the network device in the first aspect or any optional implementation manner of the first aspect. Specifically, the network device may include modules configured to execute the operations of the network device in the second aspect or any optional implementation manner of the second aspect.

According to a fifth aspect, the disclosure provides a terminal device. The terminal device may include a processor, a transceiver and a memory. The processor, the transceiver and the memory communicate to each other via an internal connection path. The memory is configured to store an instruction. The processor is configured to execute the instruction stored in the memory. When the processor executes the instruction stored in the memory, such execution enables the terminal device to execute the method in the first aspect or any possible implementation manner of the first aspect, or such execution enables the terminal device to implement the terminal device provided by the second aspect.

According to a sixth aspect, the disclosure provides a network device. The network device may include a processor, a transceiver and a memory. The processor, the transceiver and the memory communicate to each other via an internal connection path. The memory is configured to store an instruction. The processor is configured to execute the instruction stored in the memory. When the processor executes the instruction stored in the memory, such execution enables the network device to execute the method in the second aspect or any possible implementation manner of the second aspect, or such execution enables the network device to implement the network device provided by the fourth aspect.

According to a seventh aspect, the disclosure provides a system chip. The system chip may include an input interface, an output interface, a processor and a memory. The processor is configured to execute an instruction stored in the memory. When the instruction is executed, the processor may implement the method in the first aspect or any possible implementation manner of the first aspect.

According to an eighth aspect, the disclosure provides a system chip. The system chip may include an input interface, an output interface, a processor and a memory. The processor is configured to execute an instruction stored in the memory. When the instruction is executed, the processor may implement the method in the second aspect or any possible implementation manner of the second aspect.

According to a ninth aspect, the disclosure provides a computer program product including an instruction. The computer program product, when operated on a computer, may cause the computer to perform the method in the first aspect or any possible implementation manner of the first aspect.

According to a tenth aspect, the disclosure provides a computer program product including an instruction. The computer program product, when operated on a computer, may cause the computer to perform the method in the second aspect or any possible implementation manner of the second aspect.

DETAILED DESCRIPTION

The technical solutions in the embodiments of the disclosure may be applied in various communications systems, such as a Global System of Mobile communication (abbreviated as "GSM") system, a Code Division Multiple Access (abbreviated as "CDMA") system, a Wideband Code Division Multiple Access (abbreviated as "WCDMA") system, a General Packet Radio Service (abbreviated as "GPRS") system, a Long Term Evolution (abbreviated as "LTE") system, an LTE Frequency Division Duplex (abbreviated as "FDD") system, an LTE Time Division Duplex (abbreviated as "TDD") system, a Universal Mobile Telecommunication System (abbreviated as "UMTS") system, a Worldwide Interoperability for Microwave Access (abbreviated as "WiMAX") communication system or a future 5G communication system.

Figure 1:
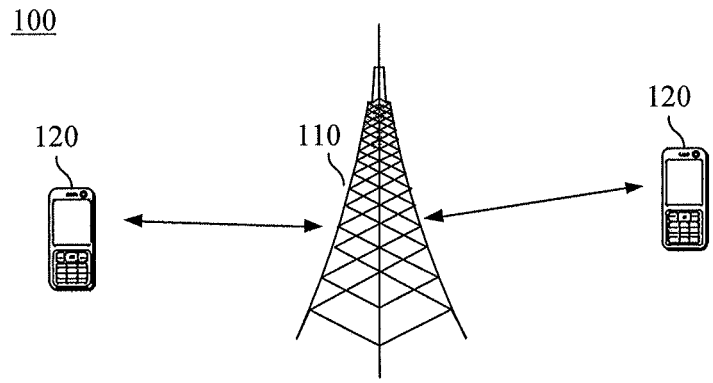
FIG. 1 illustrates a schematic diagram of a wireless communication system of an application according to an embodiment of the disclosure.

FIG. 1 illustrates a wireless communication system 100 of an application according to an embodiment of the disclosure. The wireless communication system 100 may include a network device 110. The network device 100 may be a device communicating with a terminal device. The network device 100 may provide a communication coverage for a specific geographical area, and may communicate with a terminal device (such as, User Equipment (UE)) in the coverage area. In at least one embodiment, the network device 100 may be a Base Transceiver Station (BTS) in a GSM or CDMA system, may also be a NodeB (NB) in a WCDMA system, may further be an Evolutional NodeB (eNB or eNodeB) in an LTE system, or a wireless controller in a Cloud Radio Access Network (CRAN); or the network device may be a relay station, an access point, a vehicle-mounted device, a wearable device, a network-side device in a future 5G network or a network device in a future evolutional Public Land Mobile Network (PLMN).

The wireless communication system 100 may further include at least one terminal device 120 located within a coverage of the network device 110. The terminal device 120 may be mobile or fixed. In at least one embodiment, the terminal device 120 may be an access terminal, UE, a user unit, a user station, a mobile station, a mobile radio station, a remote station, a remote terminal, a mobile device, a user terminal, a terminal, a wireless communication device, a user agent or a user device. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices connected to a wireless modem, a vehicle-mounted device, a wearable device, a terminal device in a future 5G network or a terminal device in a future evolved PLMN. In at least one embodiment, the terminal device 120 may also perform Device to Device (D2D) communication.

FIG. 1 schematically illustrates a network device and two terminal devices. In at least one embodiment, the wireless communication system 100 may include multiple network devices, and a coverage of each network device may include other number of terminal devices, which is not limited in the embodiments of the disclosure.

In at least one embodiment, the wireless communication system 100 may further include a network controller, a mobile management entity and other network entities, which is not limited in the embodiments of the disclosure.

In an NR system, five channel formats for a Physical Uplink Control Channel (PUCCH) may be supported, including PUCCH format 0, PUCCH format 1, PUCCH format 2, PUCCH format 3 and PUCCH format 4. Herein, PUCCH format 0 and PUCCH format 1 can support UCI of 1 bit or 2 bits, and PUCCH format 2, PUCCH format 3 and PUCCH format 4 can support UCI of more than 2 bits.

A terminal device may select, based on a configuration of a network device, an uplink control channel resource for transmitting UCI, and transmits the UCI by using a channel format corresponding to the uplink control channel resource. However, if the number of bits of UCI determined according to high-level parameters is not matched with the number of bits of UCI that is actually scheduled, this may cause an unnecessary bit overhead and thus the transmission efficiency of the UCI is affected.

In this embodiment of the disclosure, the terminal device determines the UCI to be transmitted based on the channel format corresponding to the uplink control channel resource, so that the number of bits for actual transmission of the UCI is less than or equal to the number of bits of the UCI determined according to the high-level parameters, thereby avoiding unnecessary bit overhead and improving the transmission efficiency of the UCI.

Figure 2:
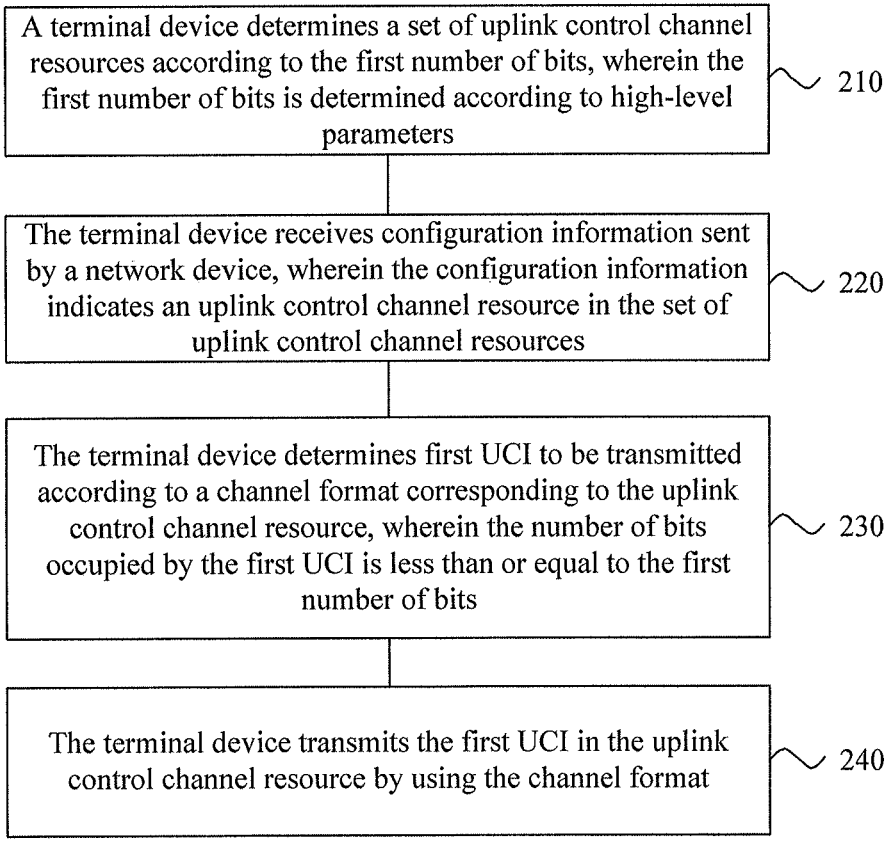
FIG. 2 illustrates a schematic flowchart of a method for transmitting UCI according to an embodiment of the disclosure.

FIG. 2 illustrates a schematic flowchart of a method for transmitting UCI according to an embodiment of the disclosure. A terminal device illustrated in FIG. 2, for example, may be the terminal device 120 illustrated in FIG. 1. As illustrated in FIG. 2, the method for transmitting the UCI may include a part or all of the following contents.

At 210, a terminal device determines a set of uplink control channel resources according to the first number of bits.

The first number of bits is determined according to high-level parameters. It may be understood that the first number of bits is semi-statically determined by the terminal device.

For example, the terminal device selects a maximum feedback time sequence and a minimum feedback time sequence from a set of Acknowledgment (ACK)/Negative Acknowledgment (NACK) time sequences according to an indication of a network device, and semi-statically determines the first number of bits according to a difference between the maximum feedback time sequence and the minimum feedback time sequence.

Also for example, the first number of bits may be agreed by a protocol.

At 220, the terminal device receives configuration information sent by a network device, wherein the configuration information indicates an uplink control channel resource in the set of uplink control channel resources.

At 230, the terminal device determines first UCI to be transmitted according to a channel format corresponding to the uplink control channel resource, wherein the number of bits occupied by the first UCI is less than or equal to the first number of bits.

At 240, the terminal device transmits the first UCI in the uplink control channel resource by using the channel format.

Specifically, the network device may configure at least one set of uplink control channel resources for the terminal device in advance, each set of uplink control channel resources includes at least one uplink control channel resource, and the terminal device may determine a size of the UCI, i.e., the first number of bits, according to the high-level parameters and select a PUCCH resource set from the at least one set of uplink control channel resources. The terminal device selects the uplink control channel resource for the first UCI to be transmitted from the PUCCH resource set according to the configuration information sent by the network device. The terminal device determines, according to a channel format corresponding to the selected uplink control channel resource, relevant information of the first UCI to be transmitted, such as the number of bits for actually transmitting the first UCI or a content of the first UCI, so that the number of bits occupied for actual transmission of the first UCI is less than or equal to the first number of bits. Therefore, the terminal device transmits the first UCI in the uplink control channel resource by using the channel format corresponding to the uplink control channel resource.

In at least one embodiment, the first number of bits is greater than or equal to a first threshold.

The first threshold may be configured by the network device for the terminal device, or may be agreed by the terminal device and the network device in advance, for example, may be agreed in a protocol and may be pre-stored in the terminal device.

In the embodiments of the disclosure, two manners are provided for the terminal device to determine the first UCI to be transmitted according to the channel format corresponding to the selected uplink control channel resource, which will be described below respectively.

Manner 1

In at least one embodiment, in 230, the operation that the terminal device determines the first UCI to be transmitted according to the channel format corresponding to the uplink control channel resource may include the following action. When the channel format corresponding to the uplink control channel resource is a first type of channel format, the terminal device determines that the number of bits occupied by the first UCI is equal to the first number of bits.

Herein, the maximum number of bits supported by the first type of channel format is greater than the first threshold.

In other words, when the channel format corresponding to the uplink control channel resource selected by the terminal device for transmitting the first UCI is greater than the first threshold, the terminal device transmits the first UCI by using the first number of bits, i.e., the number of bits occupied for actual transmission of the first UCI is the first number of bits determined according to the high-level parameters.

For example, in the table 1, it is assumed that the first threshold is equal to 2, the network device configures two PUCCH resource sets (i.e., PUCCH resource set 1 and PUCCH resource set 2) for the terminal device, and each resource set includes four PUCCH resources numbered from 0 to 3. Further, PUCCH format 0 and PUCCH format 1 are configured to support UCI of 1 bit or 2 bits, and PUCCH format 2, PUCCH format 3 and PUCCH format 4 can support UCI more than 2 bits. The terminal device first selects a PUCCH resource set according to a size of the UCI determined semi-statically by the terminal device. For example, when the size of the UCI determined according to the high-level parameters is less than or equal to 2 bits, the terminal device selects PUCCH resource set 1. When the size of the UCI determined according to the high-level parameters is greater than 2 bits, the terminal device selects PUCCH resource set 2.

A terminal device configurated with a semi-static Hybrid Automatic Request-ACKnowledgement (HARQ-ACK) codebook is a terminal device of which the number of bits used by feedback information is determined semi-statically according to the high-level parameters, and the terminal device may determine a PUCCH resource set according to a value of the semi-static HARQ-ACK codebook. For example, when the value of the semi-static HARQ-ACK codebook is 10, the terminal selects the PUCCH resource set 2.

TABLE 1

| Resource code | PUCCH resource set 1 | PUCCH resource set 2 |
| --- | --- | --- |
| 0 | PUCCH format 0 resource a' | PUCCH format 0 resource a |
| 1 | PUCCH format 0 resource b' | PUCCH format 2 resource b |
| 2 | PUCCH format 1 resource c' | PUCCH format 3 resource c |
| 3 | PUCCH format 1 resource d' | PUCCH format 4 resource d |

Assume that the terminal device selects the PUCCH resource set 2, the terminal device may select a PUCCH resource for transmitting the UCI from the PUCCH resource set 2 according to downlink control signaling sent by the network device.

When the downlink control signaling indicates a PUCCH resource numbered as 2, since a channel format corresponding to the PUCCH resource numbered as 2 is PUCCH format 3, the PUCCH format 3 may support UCI more than 2 bits and the first threshold is equal to 2, and since the maximum number of bits supported by the PUCCH format 3 is greater than the first threshold 2, the terminal device transmits 10-bit feedback information on a resource c by using the PUCCH format 3. 10 bits are the first number of bits determined according to the high-level parameters, i.e., the value of the semi-static HARQ-ACK codebook.

Manner 2

In at least one embodiment, in 230, the operation that the terminal device determines the first UCI to be transmitted according to the channel format corresponding to the uplink control channel resource may include the following action. When the channel format corresponding to the uplink control channel resource is a second type of channel format, the terminal device determines that the first UCI is feedback information corresponding to a received PDSCH.

Herein, the maximum number of bits supported by the second type of channel format is less than or equal to the first threshold.

In other words, when the channel format corresponding to the uplink control channel resource selected by the terminal device for transmitting the first UCI is less than or equal to the first threshold, the terminal device performs feedback according to PDSCHs received actually by the terminal device, i.e., the first UCI is feedback information corresponding to PDSCHs received by the terminal device. In this case, the number of bits occupied by the first UCI is determined by the number of PDSCHs received by the terminal device.

In at least one embodiment, before the terminal device determines that the first UCI is the feedback information corresponding to the received PDSCH, the method may further include the following operation. The terminal device receives a PDSCH in a target time unit set; or, the terminal device receives at least one PDSCH in the target time unit set. The number of the at least one PDSCH is less than or equal to the first threshold, and each PDSCH carriers a transmission block.

Herein, the target time unit set includes at least one target time unit, and the uplink control channel resource selected by the terminal device according to the configuration information sent by the network device is configured to carry feedback information corresponding to PDSCHs received in the target time unit.

For example, in the table 1, it is assumed that the first threshold is equal to 2, the terminal device selects the PUCCH resource set 2, and the downlink control signaling sent by the network device to the terminal device indicates a PUCCH resource numbered as 0. The channel format corresponding to the PUCCH resource numbered as 0 is the PUCCH format 0, and the PUCCH format 0 may support the UCI of 1 bit or 2 bits. Since the maximum number of bits 2 supported by the PUCCH format 0 is equal to the first threshold 2, when the number of PDSCHs received by the terminal device is less than the first threshold 2, the terminal device performs feedback according to the PDSCHs received actually by the terminal device. When the terminal device receives one PDSCH, the terminal device only sends feedback information corresponding to the PDSCH to the network device on a resource a by using the PUCCH format 0, i.e., transmitting feedback information of 1 bit. When the terminal receives two PDSCHs, the terminal device sends feedback information corresponding to the two PDSCHs to the network device on the resource a by using the PUCCH format 0, i.e., transmitting feedback information of 2 bits.

Therefore, the terminal device determines the UCI to be transmitted based on the channel format corresponding to the uplink control channel resource, so that the number of bits for actual transmission of the UCI is less than or equal to the number of bits of the UCI determined according to the high-level parameters. For example, when the maximum number of bits supported by a channel format corresponding to an uplink control channel resource to be used is greater than the first threshold, the UCI is sent by using the number of bits of the UCI determined according to the high-level parameters. When the number of bits supported by the channel format corresponding to the uplink control channel resource is less than or equal to the first threshold, the feedback is performed according the actually received PDSCHs. Therefore, an unnecessary bit overhead is prevented, and the transmission efficiency of the UCI is improved.

Figure 3:
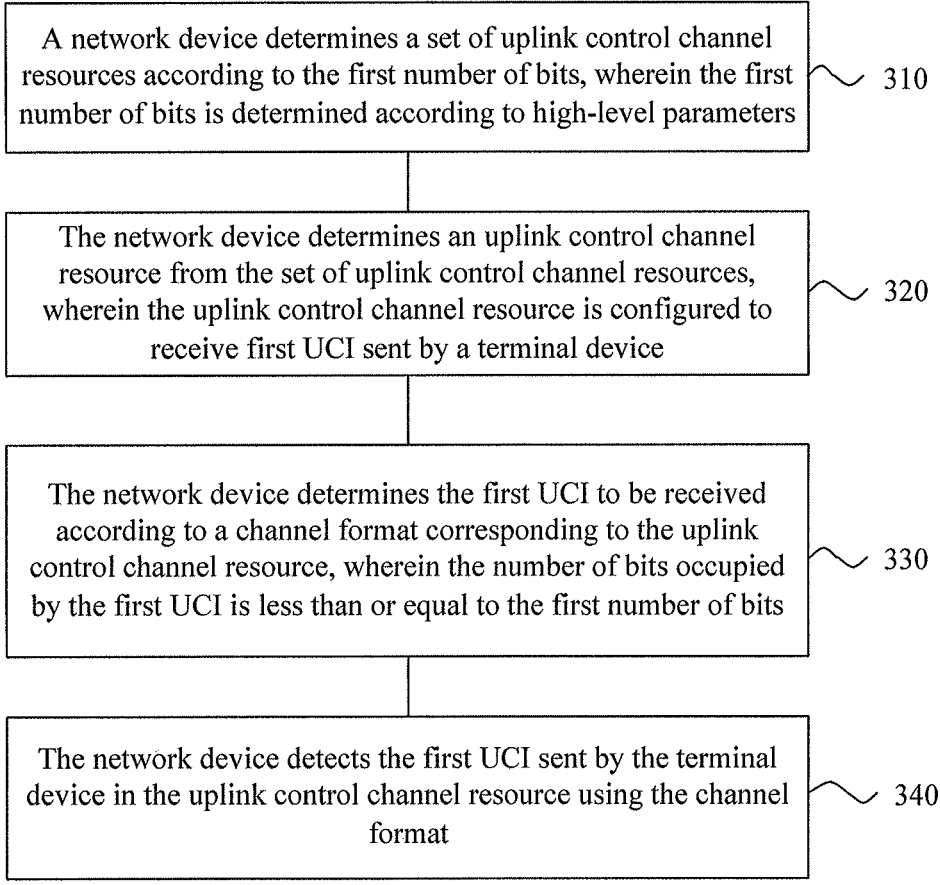
FIG. 3 illustrates a schematic flowchart of a method for transmitting UCI according to an embodiment of the disclosure.

FIG. 3 illustrates a schematic flowchart of a method for transmitting UCI according to an embodiment of the disclosure. A network device illustrated in FIG. 3, for example, may be the network device 110 illustrated in FIG. 1. As illustrated in FIG. 3, the method for transmitting the UCI may include a part or all of the following contents.

At 310, a network device determines a set of uplink control channel resources according to the first number of bits, wherein the first number of bits is determined according to high-level parameters.

At 320, the network device determines an uplink control channel resource from the set of uplink control channel resources, wherein the uplink control channel resource is configured to receive first UCI sent by a terminal device.

At 330, the network device determines the first UCI to be received according to a channel format corresponding to the uplink control channel resource, wherein the number of bits occupied by the first UCI is less than or equal to the first number of bits.

At 340, the network device detects the first UCI sent by the terminal device in the uplink control channel resource using the channel format.

Therefore, the network device receives, based on the channel format corresponding to the uplink control channel resource, the UCI sent by the terminal device, and the number of bits of the actually received UCI is less than or equal to the number of bits of the UCI determined according to the high-level parameters. Therefore, an unnecessary bit overhead is prevented, and the transmission efficiency of the UCI is improved.

In at least one embodiment, the first number of bits is greater than or equal to a first threshold.

In at least one embodiment, the operation that the network device determines the first UCI to be received according to the channel format corresponding to the uplink control channel resource may include the following action. When the channel format corresponding to the uplink control channel resource is a first type of channel format, the network device determines that the number of bits occupied by the first UCI is equal to the first number of bits. The maximum number of bits supported by the first type of channel format is greater than the first threshold.

In at least one embodiment, the operation that the network device determines the first UCI to be received according to the channel format corresponding to the uplink control channel resource may include the following action. When the channel format corresponding to the uplink control channel resource is a second type of channel format, the network device determines that the first UCI is feedback information corresponding to a sent PDSCH. The maximum number of bits supported by the second type of channel format is less than or equal to the first threshold.

In at least one embodiment, before the network device determines that the first UCI is the feedback information corresponding to the sent PDSCH, the method may further include the following operation. The network device sends a PDSCH in a target time unit set; or, the network device sends at least one PDSCH in the target time unit set, wherein the number of the at least one PDSCH is less than or equal to the first threshold, and each PDSCH carries a transmission block. The target time unit set includes at least one time unit, and the uplink control channel resource is configured to carry feedback information corresponding to PDSCHs sent in a target time unit.

In at least one embodiment, the first threshold is 2.

It is to be understood that the specific process for receiving the UCI by the network device may be referred to the above description on the terminal device in FIG. 2, which will not be elaborated here for briefness.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

The method for transmitting the UCI according to the embodiments of the disclosure is described above in detail. Hereinafter, a device according to the embodiments of the disclosure will be described below in combination with FIG. 3 to FIG. 7. Technical features described in the method embodiments are applied to the following device embodiments.

Figure 4:
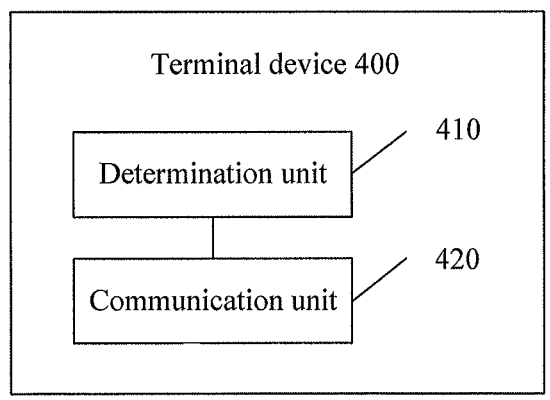
FIG. 4 illustrates a schematic block diagram of a terminal device according to an embodiment of the disclosure.

FIG. 4 illustrates a schematic block diagram of a terminal device 400 according to an embodiment of the disclosure. As illustrated in FIG. 4, the terminal device 400 may include a determination unit 410 and a communication unit 420.

The determination unit 410 is configured to determine a set of uplink control channel resources according to a first number of bits, wherein the first number of bits is determined according to high-level parameters.

The communication unit 420 is configured to receive configuration information sent by a network device. The configuration information indicates an uplink control channel resource in the set of uplink control channel resources determined by the determination unit 410.

The determination unit 410 is further configured to determine first UCI to be transmitted according to a channel format corresponding to the uplink control channel resource. The number of bits occupied by the first UCI is less than or equal to the first number of bits.

The communication unit 420 is further configured to transmit the first UCI determined by the first determination unit 410 in the uplink control channel resource using the channel format.

Therefore, the terminal device determines the UCI to be transmitted based on the channel format corresponding to the uplink control channel resource, so that the number of bits for actual transmission of the UCI is less than or equal to the number of bits of the UCI determined according to the high-level parameters. For example, when the maximum number of bits supported by a channel format corresponding to an uplink control channel resource to be used is greater than the first threshold, the UCI is sent according to the number of bits, determined according to the high-level parameters, of the UCI. When the number of bits supported by the channel format corresponding to the uplink control channel resource is less than or equal to the first threshold, the feedback is performed according to the actually received PDSCHs. Therefore, an unnecessary bit overhead is prevented and the transmission efficiency of the UCI is improved.

In at least one embodiment, the first number of bits may be greater than or equal to the first threshold.

In at least one embodiment, the determination unit 410 may specifically be configured to determine, when the channel format corresponding to the uplink control channel resource is a first type of channel format, that the number of bits occupied by the first UCI is equal to the first number of bits. The maximum number of bits supported by the first type of channel format is greater than the first threshold.

In at least one embodiment, the determination unit 410 may specifically be configured to determine, when the channel format corresponding to the uplink control channel resource is a second type of channel format, that the first UCI is feedback information corresponding to a received PDSCH. The maximum number of bits supported by the second type of channel format is less than or equal to the first threshold.

In at least one embodiment, the communication unit 420 may further be configured to receive a PDSCH in a target time unit set; or, receive multiple PDSCHs in the target time unit set, wherein the number of the multiple PDSCHs is less than or equal to the first threshold, and each PDSCH carries a transmission block. The target time unit set includes at least one time unit, and the uplink control channel resource is configured to carry feedback information corresponding to PDSCHs received in a target time unit.

In at least one embodiment, the first threshold may be 2.

It is to be understood that the terminal device 400 may execute corresponding operations executed by the terminal device in the method 200, which will not be elaborated for briefness.

Figure 5:
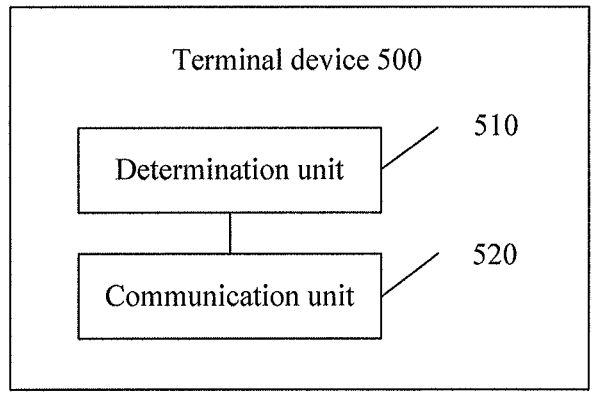
FIG. 5 illustrates a schematic block diagram of a network device according to an embodiment of the disclosure.

FIG. 5 illustrates a schematic block diagram of a network device 500 according to an embodiment of the disclosure. As illustrated in FIG. 5, the network device 500 may include a determination unit 510 and a communication unit 520.

The determination unit 510 is configured to determine a set of uplink control channel resources according to the first number of bits, wherein the first number of bits is determined according to high-level parameters.

The determination unit 510 is further configured to determine an uplink control channel resource from the set of uplink control channel resources. The uplink control channel resource is configured to receive first UCI sent by a terminal device.

The determination unit 510 is further configured to determine the first UCI to be received according to a channel format corresponding to the uplink control channel resource. The number of bits occupied by the first UCI is less than or equal to the first number of bits.

The communication unit 520 is further configured to detect the first UCI sent by the terminal device in the uplink control channel resource using the channel format.

Therefore, the network device receives the UCI sent by the terminal device based on the channel format corresponding to the uplink control channel resource, and the number of bits of the actually received UCI is less than or equal to the number of bits of the UCI determined according to the high-level parameters. Therefore, an unnecessary bit overhead is prevented, and the transmission efficiency of the UCI is improved.

In at least one embodiment, the first number of bits may be greater than or equal to a first threshold.

In at least one embodiment, the determination unit 510 may specifically be configured to determine, when the channel format corresponding to the uplink control channel resource is a first type of channel format, that the number of bits occupied by the first UCI is equal to the first number of bits. The maximum number of bits supported by the first type of channel format is greater than the first threshold.

In at least one embodiment, the determination unit 510 may specifically be configured to determine, when the channel format corresponding to the uplink control channel resource is a second type of channel format, that the first UCI is feedback information corresponding to a sent PDSCH. The maximum number of bits supported by the second type of channel format is less than or equal to the first threshold.

In at least one embodiment, the communication unit may further be configured to send a PDSCH in a target time unit set; or, send at least one PDSCH in the target time unit set, wherein the number of the at least one PDSCH is less than or equal to the first threshold, and each PDSCH carries a transmission block. The target time unit set includes at least one time unit, and the uplink control channel resource is configured to carry feedback information corresponding to PDSCHs sent in a target time unit.

In at least one embodiment, the first threshold may be 2.

It is to be understood that the network device 500 may perform corresponding operations executed by the network device in the method 300, which will not be elaborated for briefness.

Figure 6:
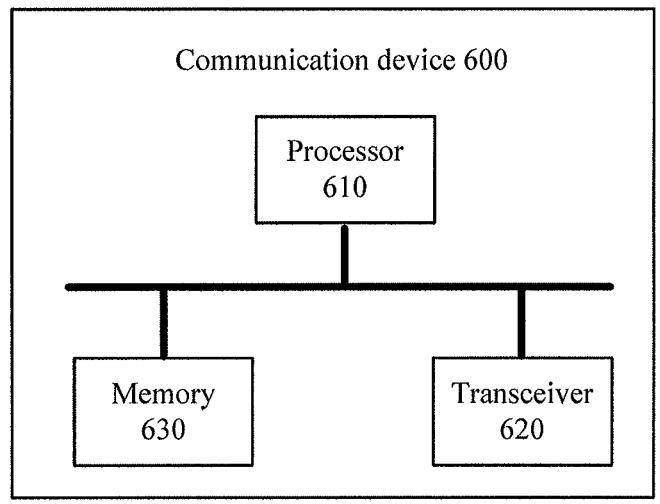
FIG. 6 illustrates a schematic structural diagram of a communication device according to an embodiment of the disclosure.

FIG. 6 illustrates a schematic block diagram of a communication device 600 according to an embodiment of the disclosure. As illustrated in FIG. 6, the communication device may include a processor 610, a transceiver 620 and a memory 630. The processor 610, the transceiver 620 and the memory 630 communicate to each other via an internal connection path. The memory 630 is configured to store an instruction. The processor 610 is configured to execute the instruction stored in the memory 630 to control the transceiver 620 to receive a signal or send a signal.

In at least one embodiment, the processor 610 may invoke a program code stored in the memory 630 to execute corresponding operations executed by the terminal device in the method 200, which will not be elaborated herein for briefness.

In at least one embodiment, the processor 610 may invoke a program code stored in the memory 630 to execute corresponding operations executed by the network device in the method 300, which will not be elaborated herein for briefness.

It is to be understood that in embodiments of the disclosure, the processor may be an integrated circuit chip and has a signal processing capability. During an implementation process, each operation in the above method embodiment may be completed via an integrated logic circuit of hardware in the processor or an instruction in a software form. The processor may be a universal processor, a Digital Signal Processor (DSP), an Application Specific Integrated Circuit (ASIC) and a Field Programmable Gate Array (FPGA) or other programmable logic devices, discrete gates or transistor logic devices, and discrete hardware component. Each method, operation and logic block diagram disclosed in the embodiments of the disclosure may be implemented or executed. The universal processor may be a microprocessor or the processor may also be any conventional processor and the like. The operations of the methods disclosed in combination the embodiments of the disclosure may be directly embodied to be executed and completed by a hardware processor or executed and completed by a combination of hardware and software modules in the processor. The software module may be located in a mature storage medium in the art, such as a Random Access Memory (RAM), a flash memory, a Read-Only Memory (ROM), a Programmable ROM (PROM), an Electrically EPROM (EEPROM) or a register. The storage medium is located in the memory. The processor reads information from the memory and completes the operations of the foregoing methods in combination with the hardware of the processor.

It can be understood that the memory in the embodiments of the disclosure may be a volatile memory or a non-volatile memory, or may include both of the volatile memory and the non-volatile memory. The volatile memory may be an ROM, a PROM, an EPROM, an EEPROM or a flash memory. The non-volatile memory may be a Random Access Memory (RAM) and used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is important to note that a memory of the system and the method described in the disclosure is intended to include, but not limited to, memories of these and any other suitable types.

Figure 7:
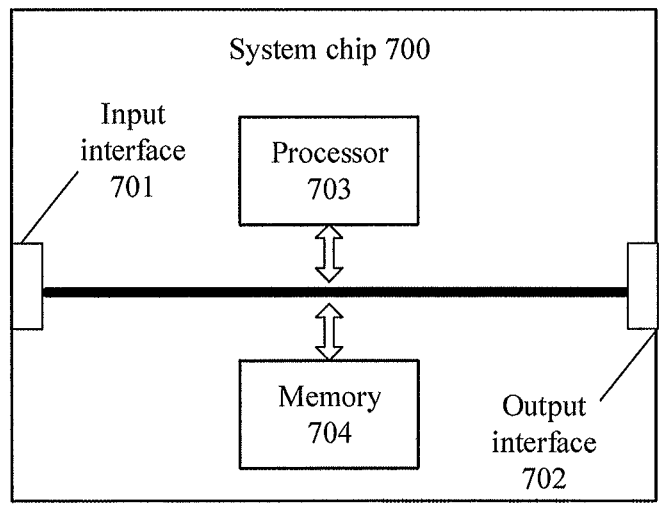
FIG. 7 illustrates a schematic structural diagram of a system chip according to an embodiment of the disclosure.

FIG. 7 illustrates a schematic structural diagram of a system chip according to an embodiment of the disclosure. The system chip 700 in FIG. 7 may include an input interface 701, an output interface 702, at least one processor 703, and a memory 704. The input interface 701, the output interface 702, the processor 703, and the memory 704 are connected to each other via an internal connection path. The processor 703 is configured to execute a code in the memory 704.

In at least one embodiment, when the code is executed, the processor 703 may implement corresponding operations executed by the terminal device in the method 200, which will not be elaborated herein for briefness.

In at least one embodiment, when the code is executed, the processor 703 may implement corresponding operations executed by the network device in the method 300, which will not be elaborated herein for briefness.

It should be understood that in the embodiments of the disclosure, "B corresponding to A" represents that B is associated with A and B may be determined according to A. It is also to be understood that determining B according to A does not mean that B is determined only according to A, and B may also be determined according to A and/or other information.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a monitoring unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting Uplink Control Information (UCI), comprising:
    determining, by a terminal device, a first number of bits according to one or more high-level parameters;
    determining, by the terminal device, a set of uplink control channel resources according to the first number of bits;
    receiving, by the terminal device, configuration information sent by a network device, wherein the configuration information indicates an uplink control channel resource in the set of uplink control channel resources;

determining, by the terminal device, first UCI to be transmitted according to a channel format corresponding to the uplink control channel resource, wherein a number of bits occupied by the first UCI is less than the first number of bits; and transmitting, by the terminal device, the first UCI in the uplink control channel resource using the channel format;

wherein the first number of bits is equal to a first threshold.

2. The method of claim 1, wherein the channel format corresponding to the uplink control channel resource is a first type of channel format, and a maximum number of bits supported by the first type of channel format is greater than the first threshold.

3. The method of claim 1, wherein when the channel format corresponding to the uplink control channel resource is a second type of channel format, the first UCI is feedback information corresponding to a received Physical Downlink Shared Chanel (PDSCH); and wherein a maximum number of bits supported by the second type of channel format is less than or equal to the first threshold.

4. The method of claim 3, wherein the method further comprises:

receiving, by the terminal device, a PDSCH in a target time unit set; or receiving, by the terminal device, at least one PDSCH in the target time unit set, wherein a number of the at least one PDSCH is less than or equal to the first threshold, and wherein each PDSCH carries a transmission block, wherein the target time unit set comprises at least one target time unit, and the uplink control channel resource is configured to carry feedback information corresponding to PDSCHs received in the target time unit.

5. The method of claim 1, wherein the first threshold is 2.

6. A method for obtaining Uplink Control Information (UCI), comprising:

determining, by a network device, a set of uplink control channel resources according to a first number of bits, wherein the first number of bits is determined according to one or more high-level parameters;

sending, by the network device, configuration information to a terminal device, wherein the configuration information indicates an uplink control channel resource from the set of uplink control channel resources, wherein the uplink control channel resource is configured to receive first UCI sent by the terminal device;

determining, by the network device, the first UCI to be received according to a channel format corresponding to the uplink control channel resource, wherein a number of bits occupied by the first UCI is less than the first number of bits; and detecting, by the network device using the channel format, the first UCI sent by the terminal device in the uplink control channel resource, wherein the first number of bits is equal to a first threshold.

7. The method of claim 6, wherein the channel format corresponding to the uplink control channel resource is a first type of channel format, and a maximum number of bits supported by the first type of channel format is greater than the first threshold.

8. The method of claim 6, wherein when the channel format corresponding to the uplink control channel resource is a second type of channel format, the first UCI is feedback information corresponding to a sent Physical Downlink Shared Chanel (PDSCH); and wherein a maximum number of bits supported by the second type of channel format is less than or equal to the first threshold.

9. The method of claim 8, wherein the method further comprises:

sending, by the network device, a PDSCH in a target time unit set; or sending, by the network device, at least one PDSCH in the target time unit set, wherein a number of the at least one PDSCH is less than or equal to the first threshold, and wherein each PDSCH carries a transmission block, wherein the target time unit set comprises at least one target time unit, and the uplink control channel resource is configured to carry feedback information corresponding to PDSCHs sent in the target time unit.

10. The method of claim 6, wherein the first threshold is 2.

11. A terminal device, comprising:

a memory, a transceiver and a processor, wherein the memory is configured to store one or more computer programs that, when executed by the processor, cause the terminal device to perform operations comprising:

determining a first number of bits according to one or more high-level parameters;

determining a set of uplink control channel resources according to the first number of bits;

receiving configuration information sent by a network device, wherein the configuration information indicates an uplink control channel resource in the set of uplink control channel resources;

determining first Uplink Control information (UCI) to be transmitted according to a channel format corresponding to the uplink control channel resource, wherein a number of bits occupied by the first UCI is less than the first number of bits; and transmitting the first UCI in the uplink control channel resource using the channel format;

wherein the first number of bits is equal to a first threshold.

12. The terminal device of claim 11, wherein the channel format corresponding to the uplink control channel resource is a first type of channel format, and a maximum number of bits supported by the first type of channel format is greater than the first threshold.

13. The terminal device of claim 11, wherein when the channel format corresponding to the uplink control channel resource is a second type of channel format, the first UCI is feedback information corresponding to a received Physical Downlink Shared Chanel (PDSCH); and wherein a maximum number of bits supported by the second type of channel format is less than or equal to the first threshold.

14. The terminal device of claim 13, wherein the operations further comprise:

receiving a PDSCH in a target time unit set; or receiving multiple PDSCHs in the target time unit set, wherein a number of the multiple PDSCHs is less than or equal to the first threshold, and wherein each PDSCH carries a transmission block, wherein the target time unit set comprises at least one target time unit, and the uplink control channel resource is configured to carry feedback information corresponding to PDSCHs received in the target time unit.

15. The terminal device of claim 11, wherein the first threshold is 2.

* * * * *